(12) United States Patent
Prateek et al.

(10) Patent No.: US 10,122,602 B1
(45) Date of Patent: Nov. 6, 2018

(54) DISTRIBUTED SYSTEM INFRASTRUCTURE TESTING

(71) Applicant: Amazon Technologies, Inc., Seattle, WA (US)

(72) Inventors: Anuj Prateek, Edmonds, WA (US); Weston Connor Panther, Seattle, WA (US); Christopher Lee Mullins, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 422 days.

(21) Appl. No.: 14/868,100

(22) Filed: Sep. 28, 2015

(51) Int. Cl.
*G06F 15/173* (2006.01)
*H04L 12/26* (2006.01)

(52) U.S. Cl.
CPC .............. *H04L 43/08* (2013.01); *H04L 43/50* (2013.01)

(58) Field of Classification Search
CPC ................................ H04L 43/08; H04L 43/50
USPC ......................................... 709/224, 200, 217
See application file for complete search history.

(56) References Cited

U.S. PATENT DOCUMENTS

2015/0081243 A1* 3/2015 Ganai ................. G06F 11/3688
702/123

OTHER PUBLICATIONS

Wikipedia, "Chaos Monkey," retrieved Aug. 6, 2015 from https://en.wikipedia.org/wiki/Chaos_Monkey, 1 pg.
Wikipedia, "Gremlin (programming language)," retrieved Oct. 2, 2015 from https://en.wikipedia.org/wiki/Gremlin_(programming_language), 7 pgs.
Wikipedia, "Regression Testing," retrieved Aug. 6, 2015 from https://en.wikipedia.org/wiki/Regression_testing, 4 pgs.

* cited by examiner

*Primary Examiner* — El Hadji Sall
(74) *Attorney, Agent, or Firm* — Seed IP Law Group LLP

(57) ABSTRACT

Techniques are described for performing infrastructure testing of a distributed system. Such testing may be performed by an infrastructure testing service that includes, for example, a manager component and multiple agent components each executing on one of multiple computing devices that are implementing the distributed system. The manager utilizes failure information to schedule failures to occur on target host devices. The manager determines if the distributed system is in a healthy state, and if so, provides failure information to the agent on a target host device. The agent then executes one or more commands on the target host device to cause the failure to occur, and monitors the distributed system and the target host device as they recover from the failure. The infrastructure testing service utilizes this monitored information to initiate other actions based on the recovery.

21 Claims, 8 Drawing Sheets

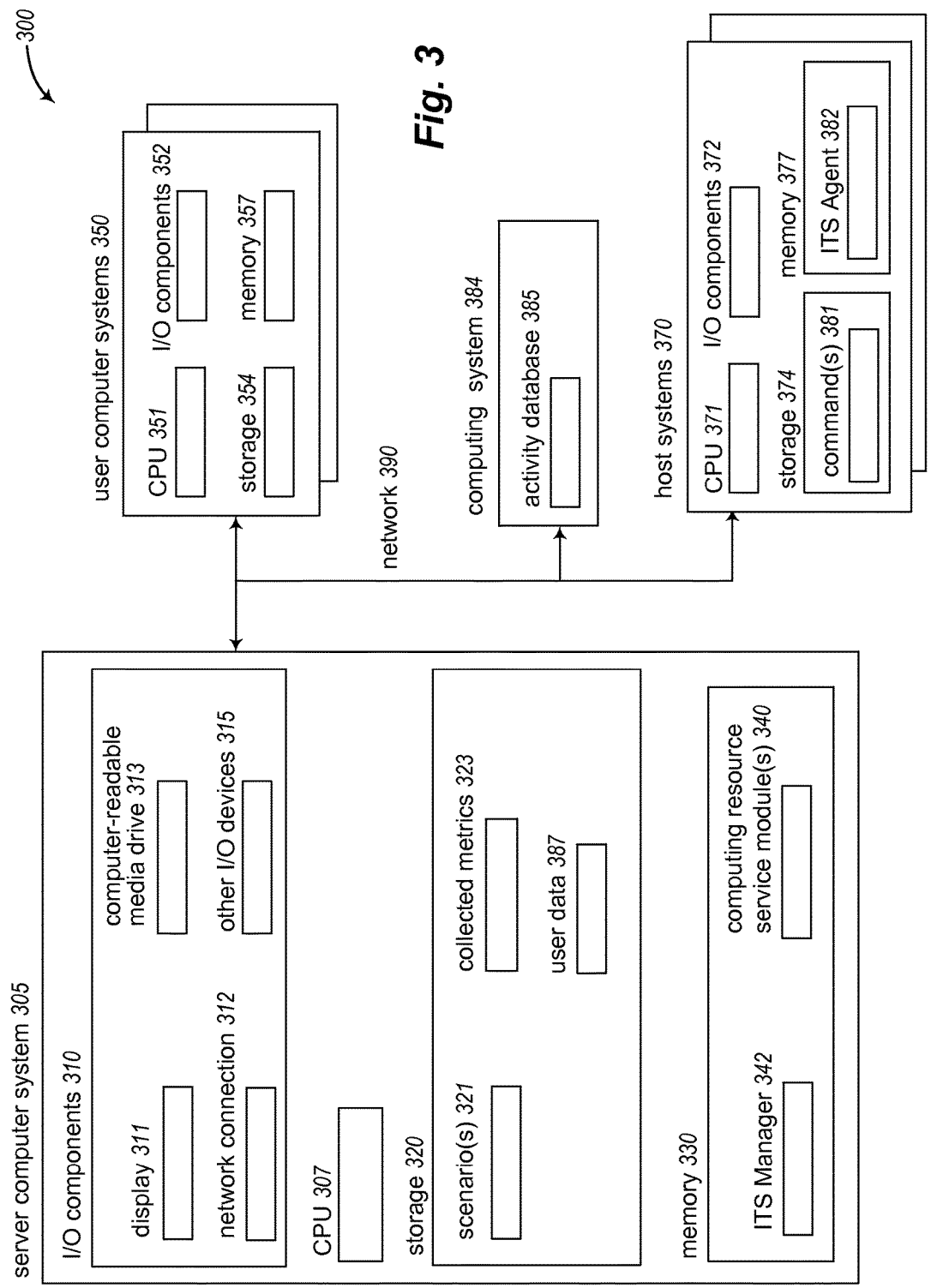

DISTRIBUTED SYSTEM INFRASTRUCTURE TESTING

BACKGROUND

Many companies and other organizations operate distributed systems that use multiple interconnect computing systems to implement their operations, with the computing systems being alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses to provide computing resources to customers. However, as the scale and scope of typical distributed systems has increased, the task of managing the distributed systems and their associated physical computing resources has become increasingly complicated.

Thus, various problems exist with the implementation and use of such distributed systems, including with managing associated physical computing resources.

BRIEF DESCRIPTION OF THE DRAWINGS

FIG. 3 is a block diagram illustrating example computing systems suitable for executing an embodiment of a system for providing an infrastructure testing service that performs infrastructure testing for users of the service.

DETAILED DESCRIPTION

Figure 1:
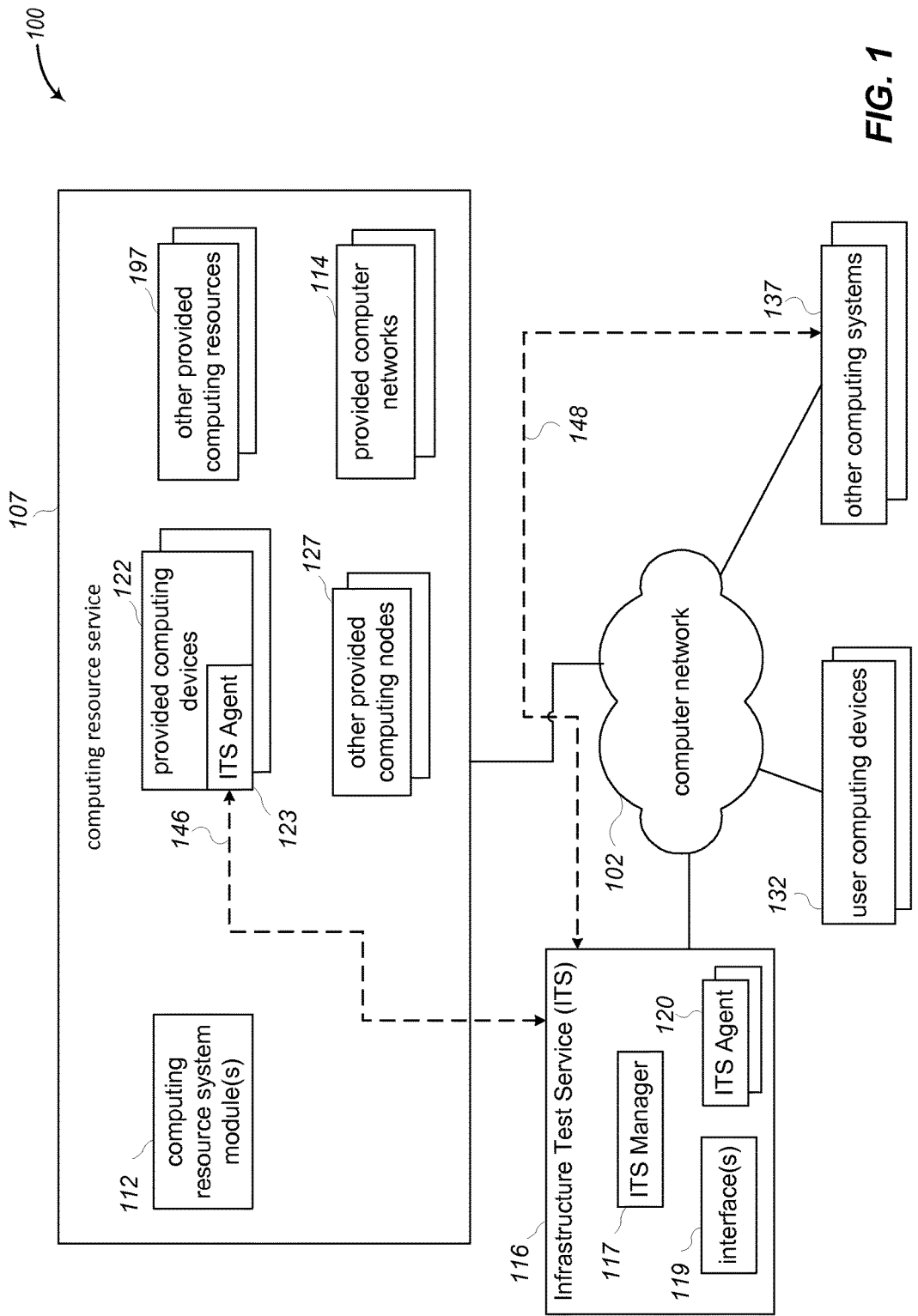
FIG. 1 is a network diagram illustrating an example environment in which techniques may be used for performing infrastructure testing on target host devices.

Techniques are described for providing infrastructure testing functionality for distributed systems while they are executing, such as in a service provider environment that provides computing nodes and other computing-related resources to customers and/or to other internal users. In at least some embodiments, an infrastructure testing service is provided for use by such users (e.g., by the service provider), such as to provide an interface that enables the users to define configuration information for performing failure and recovery testing on multiple target host devices that are implementing a distributed system for a user. The configuration information may specify, for example, information for use by the infrastructure testing service in determining if the distributed system is available to be tested at a particular time (e.g., if the distributed system is sufficiently resilient or 'healthy' at that time, such as based on a quantity of host devices that are participating in implementing the distributed system, based on a load or other operational characteristic of the distributed system, etc.), in determining one or more types of failures to implement during the testing (e.g., as selected by a user from a plurality of types of failures that the infrastructure testing service is able to implement), in determining how and when to select particular target host devices on which to implement failures, etc.

In some embodiments, the infrastructure testing service is implemented by an infrastructure testing system that includes a manager component to coordinate and direct activities of multiple agent components that are each executing on one of multiple computing devices the distributed system. The manager component utilizes user-configurable information to select one or more target host devices from the multiple computing devices, and to determine and schedule one or more failures to occur on each of the selected target host devices. The manager component may further determine if the distributed system is in a healthy state, such as by satisfying one or more defined operational characteristics (e.g., related to load on the distributed system, such as from requests from end users and/or other systems; related to capabilities currently available from the distributed system; related to a current time; etc.). If the distributed system satisfies any such operational characteristics, the manager component then provides information about one or more failures to be implemented to an agent component executing on a selected target host device. That agent component then executes one or more commands on that target host device to cause the one or more failures to occur, and monitors the target host device (and optionally, and more generally, functionality of the distributed system) as it recovers from the failure (or fails to recover), such as to identify any problems that may occur. The agent and/or manager components of the infrastructure testing service then utilize this monitored information to initiate other actions based on the recovery of the distributed system or the target host device, such as to attempt to repair or otherwise address any problems that occur.

For example, assume an owner of a distributed system wants to find out how the distributed system will respond if one of the multiple computing devices that implement the distributed system loses power. In particular, the owner may want to know, for example, how the distributed system handles incoming network traffic when one of the multiple computing devices (also referred to as 'host devices' herein) has lost power, and what happens to the data being processed by that computing device. The owner can then set up a corresponding failure scenario to test some or all of the multiple computing devices implementing the distributed system. The failure scenario may indicate that a selected target host device is to immediately reboot without saving state, which would operate similar to a complete loss and restoration of power to the target host device. The manager component of the infrastructure testing service determines a current state of the distributed system and whether the distributed system should properly operate after the selected target host devices loses power, and if so schedules the power failure scenario to be executed by an agent component on the selected target host device. The agent component then executes one or more commands to reboot the target host device. As the target host device reboots, the agent component automatically restarts its execution and monitors and collects information associated with the target host device and the distributed system, such as how startup of the selected target host device and its portion of the distributed system occurs, and more generally how the selected target host device and/or the distributed system recovers from the target host device being turned off. If the target host device fails to successfully restart, then the manager component may send a notification to the owner indicating that there was a problem from the failure scenario. The agent component or the manager component may similarly send other notifications to the owner if other problems are detected in the recovery, or they may initiate other automated actions to be performed, such as scheduling other failures to be performed on the same or other target host devices, performing device upgrades or other modifications on the same or other target host devices, or the like. Based on the collected information and metrics derived therefrom, the owner may learn how the distributed system may recover if one of its host devices loses power, and take further actions as appropriate to change portions of the distributed system.

In at least some of the embodiments described below, the described techniques may be used with computing devices and other computing-related resources provided by one or more service provider environments to users of those environments, such as to use computing resources provided by such an environment to execute programs of a plurality of users of the environment. In other embodiments, the described techniques may be used with other types of computing devices in other types of situations, including by a company or other organization on behalf of internal members or other users using devices provided by the company/organization, by an entity that provides infrastructure testing services for devices provided or controlled by other entities (e.g., for users to use an online infrastructure testing service to test devices in their homes or businesses), etc. In addition, while various specific types of target host devices, monitoring activities, failure implementation activities, and automated response activities are discussed for the purpose of illustration, it will be appreciated that the described techniques may be used with other types of devices, monitoring activities, failure implementation activities, and/or automated response activities—as one example, while commands are discussed in some embodiments as being executed on target host devices (e.g., by agent software executing on those target host devices), other types of failure implementation activities and/or recovery monitoring activities may be used in other embodiments using other devices that can affect the target host devices and/or that can monitor information about the target host devices. Embodiments discussed below are provided for illustrative purposes and are simplified for the sake of brevity, and the inventive techniques may be used in a wide variety of other situations, some of which are discussed below.

FIG. 1 is a network diagram illustrating an example of a computing resource service that provides user-configurable computing resources to users, such as managed computing nodes, virtual computer networks, etc. After such computing resources are configured and provided by the computing resource service for a user of the computing resource service, the user may interact from one or more remote locations with the provided computing resources, such as to execute programs on the computing nodes, to dynamically modify the provided virtual computer network(s) and/or the provided computing node(s) while they are in use, etc. The described techniques for providing users with access to perform failures on target host devices and associated functionality may be used in some embodiments with such a computing resource service, as discussed in greater detail elsewhere herein, including with respect to the examples of FIGS. 2A-2D and the flowcharts illustrated and described in conjunction with FIGS. 4-5.

In particular, example system 100 of FIG. 1 includes a computing resource service 107 implemented using one or more configured computing systems (not shown) to provide functionality over one or more computer networks 102 (e.g., over the Internet) to users (not shown) using user computing devices 132. The computing resource service 107 may, for example, be part of an environment provided by a service provider entity, such as an online network service available over the Internet or other network. The computing resource service 107 enables the users to access and use distributed systems on computing devices 122, other computing nodes 127, computer networks 114, and/or other computing resources 197 provided to the user by the computing resource service 107, although in other embodiments and situations a particular computing resource service may provide a subset of such types of computing-related resources (e.g., only one of computing nodes, virtual computer networks, and other computing resources). For example, a number of users interact over the computer network 102 with computing resource system module(s) 112 of the computing resource service 107 to create and configure a distributed system implemented by the provided computing devices 122, to create and configure various other provided computing nodes 127 and/or computer networks 114 being provided by the computing resource service 107. In this example embodiment, the computing resource system module(s) 112 assist in providing functionality of the computing resource service 107 to the remote users, such as modifying which computing-related resources 122, 127, 114, and 197 are in use for the requesting user (e.g., by terminating or stopping use of particular computing-related resources that were previously allocated to and provided for the user, by adding or otherwise initiating use of additional provided computing-related resources 122, 127, 114, and 197 for the user, etc.). In some embodiments and situations, some commands or other related requests intended for the provided computing-related resources 122, 127, 114, and 197 may be sent directly to those provided computing-related resources without being controlled by the computing resource system module 112.

The computing resource service 107 also includes one or more interfaces (not shown) to provide functionality of the computing resource service 107 to the remote users, such as to provide access of users to the other provided computing nodes 127, provided virtual computer networks 112, and/or other provided computing resources 197 (e.g., databases, storage volumes, or other storage structures). These interfaces may utilize one or more APIs (application programming interfaces) that enable remote computing systems to programmatically interact with the computing resource system module 112 and/or to access some or all functionality of computing resource service 107 on behalf of users (e.g., to perform failure scenarios on computing devices 122; to create, configure, and/or initiate use of provided computing nodes 127 and/or managed computer networks 114; etc.). In addition, in at least some embodiments, the interface(s) may include one or more GUIs (graphical user interfaces) via which users manually interact with the computing resource service 107 to perform some or all such actions.

Each of the provided computer networks 114 may be virtual or physical networks and may be configured in various ways by the users for whom they are provided. In some situations, at least some such virtual computer networks may be created and configured as network extensions to existing remote private computer networks of users, although in the illustrated embodiment the provided computer networks 114 are not shown to be connected to such other existing or virtual computer networks. In addition, at least some such computer networks may each be a private computer network that is accessible only by the user that creates it, although in other embodiments at least some computer networks provided by the computing resource service 107 for users may be publicly accessible. For example, each of the provided computer networks 114 includes multiple computing nodes (not shown), at least some of which are from the plurality of computing nodes 127 provided by or otherwise under the control of the computing resource service 107, while in other embodiments at least some other computing systems 137 may be used to provide some or all computing nodes for one or more of the provided computer networks 114—such other computing systems 137 may, for example, be provided by or under control of the user for whom a computer network 114 that uses those other computing systems 137 is provided, or may be computing systems that are provided by third parties (e.g., for a fee). For example, in at least some embodiments, each provided computer network 114 may include a customer-configured quantity of multiple such computing nodes that are dedicated for use as part of that provided computer network. In particular, a user may interact with the computing resource system module 112 to configure a quantity of computing nodes to initially be included in a computer network provided for the user (e.g., via one or more programmatic interactions with an API provided by the computing resource service 107), and may further configure a network topology of the provided computer network (e.g., one or more logical subnets that each includes one or more of the provided computing devices 122, the other provided computing nodes 127, endpoints for VPN (virtual private network) connections or connections to other external entities, etc.

In addition, the computing resource service 107 may provide multiple different types of computing nodes in at least some embodiments, such as, for example, computing nodes with various performance characteristics (e.g., processor speed, memory available, storage available, etc.) or other capabilities. If so, in at least some such embodiments, a user may specify the types of computing nodes to be included in a provided computer network for the customer. In addition, in at least some embodiments, the computing nodes may be physical computing systems or may be virtual machines that are each hosted on one or more physical computing systems or physical computing machines, and the communications that are handled for managed virtual computer networks may include transmissions of data (e.g., messages, packets, frames, streams, etc.) in various formats. Furthermore, in at least some situations, an embodiment of the computing resource service may be part of or otherwise affiliated with a program execution service (or "PES") that executes multiple programs on behalf of multiple users of the service, such as a program execution service that uses multiple computing systems on multiple physical networks (e.g., multiple physical computing systems and networks within one or more data centers), optionally in multiple geographical locations. Thus, computing-related resources 122, 127, 197, and/or 114 may be provided for users in various manners in various embodiments, and may be configured to have various types of functionality in various embodiments.

The system 100 also includes an infrastructure test service (ITS) 116 implemented using one or more other configured computing systems (not shown) to provide functionality to users using user computing devices 132 to cause one or more failures on the provided computing devices 122 and to test the recoverability of a distributed system implemented by the provided computing devices 122. ITS 116 enables the users to provide configuration information that includes one or more criteria for use in selecting which of the provided computing devices 122 (e.g., target host devices) to cause the failure to occur, when to cause the failure (e.g., scheduled testing times), what type of failure to cause (e.g., the ITS 116 may include a plurality of predefined failures that the user can select, or the user can define their own failures and the commands for the provided computing devices 122 to execute to cause the user-defined failures), minimum quantity of the provided computing devices 122 that are participating in providing services to the user, one or more operational characteristics to determine if the distributed system is healthy, etc.

The infrastructure test service 116 includes one or more interfaces 119 to enable the remote users to access and configure an Infrastructure Test Service (ITS) Manager 117 to—in conjunction with ITS agents 123 executing on each of the provided computing devices 122—perform some or all of the described techniques to cause one or more failures to occur on the provided computing devices 122 and to monitor the recovery of the provided computing devices 122 and/or the distributed system being implemented by the provided computing devices 122. In the illustrated embodiment, when users of computing devices 132 use the interface(s) 119 to configure failures for the provided computing devices 122, the ITS manager 117 determines whether and how to perform such failures (e.g., by utilizing system state information, user configuration information, results from previously executed failures, etc.), distributes ITS agent 120 (e.g., a software module) to be executed on one or more of the provided computing devices 122, and then performs subsequent corresponding interactions 146 with the ITS agents 123 on the provided computing devices 122 on behalf of the user as appropriate. As described in greater detail elsewhere herein, such interactions may include, for example, providing failure scenarios or activities to the ITS agents 123 to cause a failure to occur on the provided computing devices 122, obtaining various recovery information describing the recovery of the provided computing devices 122 and/or the distributed system implemented thereon, etc.

The other computing systems 137 may also in some embodiments and situations have stored thereon an ITS agent (not shown) to cause various failures to occur on the other computing systems 137, such as in response to interactions 148 with those other computing systems 137 (which are shown as logically occurring directly between the Manager 117 and the other computing systems 137, but it will be appreciated that some or all such interactions may occur over the one or more computer networks 102 and/or via the interface(s) 119)—however, in other embodiments, some or all of the other computing systems 137 and/or provided computing devices 122 may not execute such ITS agent software, such as if the Manager 117 directly implements commands or other changes on those other computing systems 137 and/or provided computing devices 122. The other computing system 137 may, for example, be computing systems locally hosted or maintained by a user rather than by an online service environment such as computing resource service 107. Accordingly, the functionality of the ITS manager and agent can be utilized to test the recoverability of distributed systems implemented by the other computing system 137 in such embodiments and situations. Similarly, a distributed system may be partially implemented by the other computing systems 137 and partially implemented by the computing devices 122 provided by the computing resource service 107 in some embodiments and situations, with the infrastructure testing service interacting with the other computing systems 137 and/or the computing devices 122 as appropriate (e.g., to test the entire distributed system by implementing failures on only the computing devices 122)—the ITS manager 117 can communicate with ITS agents executing on these various devices to test the recoverability of the distributed system, which can identify impacts to the distributed system caused by a failure of one of the other computing systems 137 compared to a failure of one of the provided computing devices 122. It should be noted that the interactions 146 and/or 148 may be communicated via one or more private networks or via computing network 102. In some embodiments, ITS 116 may be integrated in and provided by computing resource service 107. In other embodiments, ITS 116 may be integrated in and provided by the other computing systems 137. Or ITS 116 may be a separate service that interacts with the provided computing devices 122 and/or the other computing systems 137 via the ITS agents, as illustrated.

The computer network 102 may be, for example, a publicly accessible network of linked networks, possibly operated by distinct parties, such as the Internet. Similarly, the computing resource service 107 may include one or more internal networks (not shown) for connecting computing systems of the computing resource service 107 to each other, such as internal networks that are separate and distinct from the computer network 102.

Figure 2A:
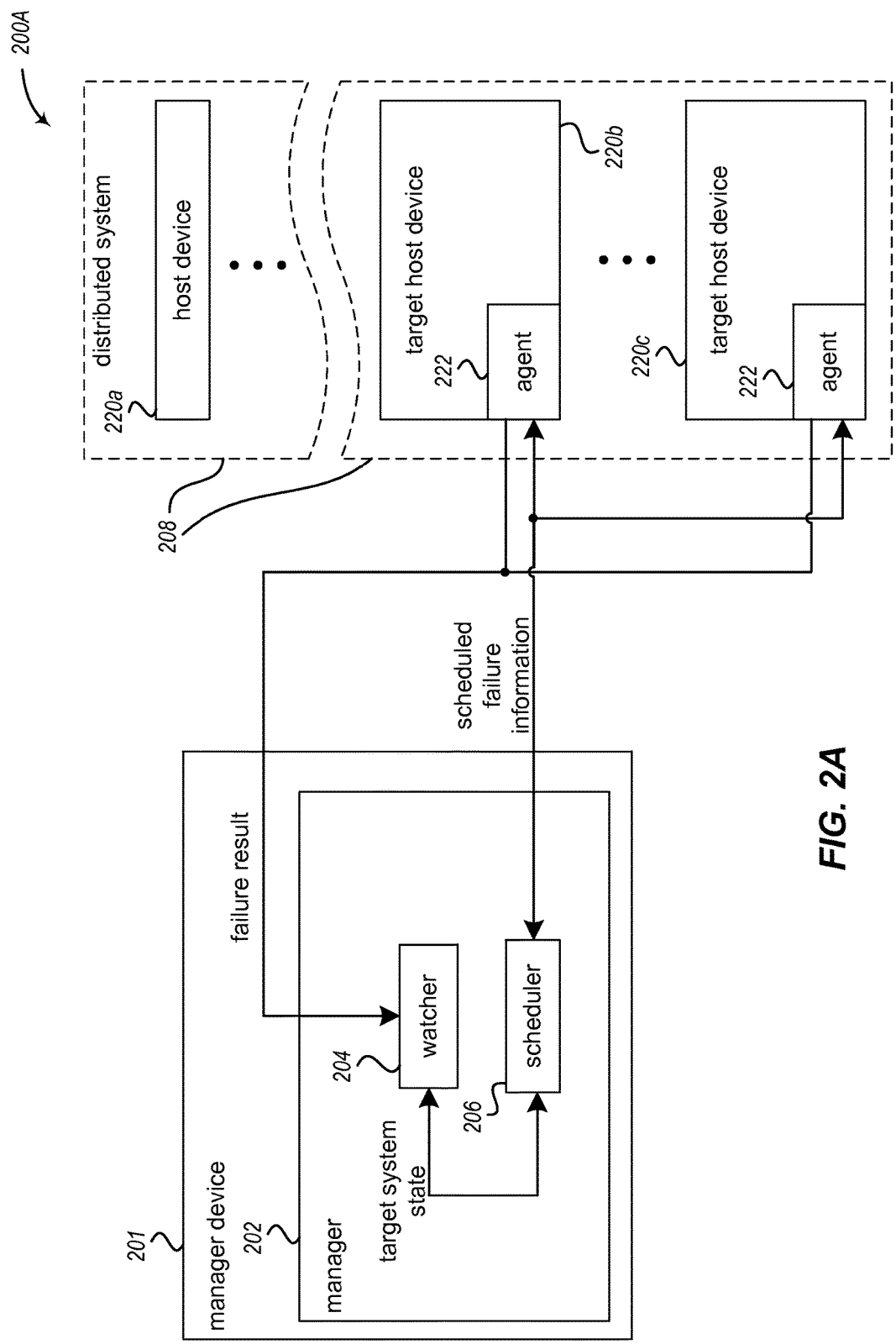
FIGS. 2A-2D illustrate example systems for performing infrastructure testing of target host devices.

FIGS. 2A-2D illustrate example systems for performing infrastructure testing of a distributed system implemented by a plurality of target host devices. System 200A in FIG. 2A provides a general introduction to the architecture and components of the infrastructure testing service (ITS). The system 200A includes a manager device 201 (e.g., ITS manager 117 in FIG. 1) and a plurality of host devices 220a-220c (e.g., provided computing devices 122 in FIG. 1) that are implementing distributed system 208 that provides one or more services for a client over a computer network (e.g., computer network 102 in FIG. 1) to a plurality of end users (e.g., users of user computing devices 132 in FIG. 1).

The manager device 201 may be a server computer or other system management computer that is executing a manager component 202 that is in communication with agent components 222 executing on one or more target host devices (e.g., host devices 220b and 220c). Briefly, the manager component 202 includes a watcher component 204 and a scheduler component 206. The watcher component 204 determines a current state of the distributed system 208 and/or the host devices 220a-220c, and provides it to the scheduler component 206. In some embodiments, the watcher component 204 also receives, such as from the agent components 222, results information associated with previously executed failures, and further determines the state of the distributed system based on the received results.

The scheduler component 206 determines which failures to run on which target host devices 220b-220c, and when those failures are to be performed by the agent component 222. The scheduler component 206 obtains the state information from the watcher component 204. If the system is in a healthy state, e.g., the distributed system 208 or one or more of the host devices 220a-220c satisfy one or more specified operational characteristics (e.g., CPU utilization of a target host device being below a threshold, network latency or bandwidth between the host devices being below another threshold, non-target host devices (e.g., host device 220a) having sufficient computing resources to sustain the current state of the distributed system, etc.), then the scheduler component 206 provides scheduled failure information to one or more agents 222 executing on the target host devices 220b-220c.

The scheduled failure information may be specific failure commands, failure activities, or failure scenarios. A failure command is a command or instruction that is executable by a specific target host device to cause a failure to occur (e.g., a specific operating system instruction to reboot the target host device). A failure activity is a generalized failure to occur on a target host device, such that an agent component can determine one or more commands to execute on the target host device to cause the failure to occur (e.g., a generalized request for the target host device to reboot without including a command or instruction specific to the operating system executing on the target host device). A failure scenario is a group of one or more activities to perform on a target host device. In some embodiments, the activities in a scenario are in a predetermined sequence of execution.

Failures may be host failures (e.g., reboot, clean or unclean, target host device; increase disk input/output to cause contention; fill disk space; spawn several threads or processes that are input/output intensive; etc.), network failures (e.g., block incoming or outgoing traffic, terminate ongoing TCP connections, disable target host device, lock all or selective ports used by target host device, send random traffic to target host device, increase number of incoming connections, increase long poll connections, create additional short lived connections, selectively reject traffic originating from or to various target host devices, etc.), service failures (e.g., increase traffic, make multiple connections to service and drop them abruptly, terminate service process, terminate process manager, create multiple long poll request on service, disable access of other services from target host device, disable access to configuration systems, restart service, etc.), or other types of device failures. In some embodiments, an owner or manager of the distributed system 208 can specify categories for failure scenarios or activities (e.g., network failures, host failures, software failures, etc.) to be performed on specific host devices.

As mentioned above, the host devices 220a-220c implement the distributed system 208. As described in more detail below, a user or owner can have an agent component 222—that performs various failures to test recoverability of the distributed system 208—on-boarded onto one or more of the host devices 220a-220c. These on-boarded host devices are referred to as target host devices (e.g., host devices 220b-220c). In general, the agent component 222 is installed onto a target host device 220b-220c such that it is in communication with and can provide commands to an operating system or other program or application executing on that target host device to cause a failure to occur on that target host device. In various embodiments, an owner or manager of the distributed system 208 can select which host devices to on-board an agent component 222, or the owner can opt-out of on-boarded agents all together.

The functionality of the agent component 222 is described in more detail below, but briefly, the agent component 222 obtains, from the manager component 202, scheduled failure information for one or more failures to occur on the corresponding target host device. The agent component 222 then executes, based on the received scheduled failure information, one or more commands on the target host device to cause the failure to occur. After the failure occurs, the agent component 222 (or the manager component 202) monitors and obtains recovery information associated with the recovery of the distributed system and/or the target host device from the failure. The agent component 222 provides the recovery information or other failure results back to the manager component 202. This recovery information may be alarms, metrics, recovery time, etc.

In some embodiments, a failure of one target host device may be caused by introducing a failure to another target host device. For example, to cause a network failure at target host device 220*b* (e.g., as a network failure caused by a person unplugging or cutting the network cable of the target host device), the agent component 222 on the target host device 220*c* may provide a command to the target host device 220*c* to halt sending messages to the target host device 220*b*. After some time period, the agent component 222 on target host device 220*c* provides another command to the target host device 220*c* to resume sending messages to the target host device 220*b*. In this way, the agent component 222 on the target host device 220*b* (or the agent component 222 on the target host device 220*c*) can observe the failure of not receiving any inbound communications and can monitor and collect recovery information associated with the distributed system 220 and the target host device's 220*b* ability to recover from the failure.

In some embodiments, the manager component 202 may terminate a failure that is currently being executed on the target host device 220*b* by sending an instruction to the agent component 222. The agent component 222 stops executing additional commands on the target host device to halt all or specified failures from continuing to execute on the target host device. The manager component 202 (or the agent component 222 without instruction from the manager component 202) may terminate a failure based on an instruction received from a user, a change in the health of the distributed system or the target host device, etc. In some embodiments, if the agent 222 successfully terminates a failure, the manager component 202 may reschedule the failure for a later date and time.

Figure 2B:
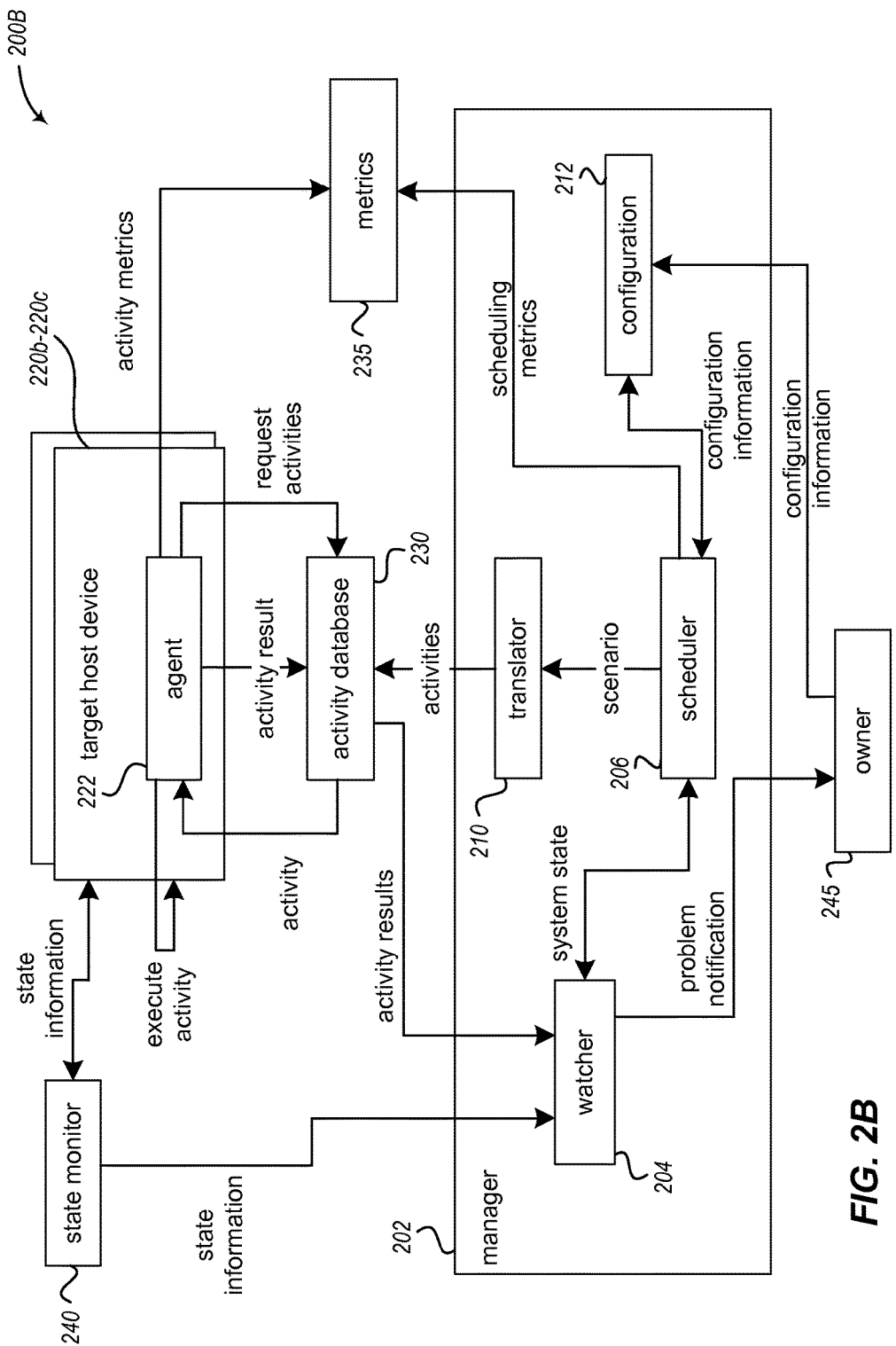

System 200B in FIG. 2B provides additional details regarding system 200A and the infrastructure testing service (ITS) described herein. The system 200B includes the manager component 202 and the agent component 222 on target host devices 220*b*-220*c*. The system 200B also includes an activity database 230 that functions as an intermediate communication mechanism between the manager component 202 and the agent component 222. For example, the manager component 202 stores activities scheduled for execution by the target host devices 220*b*-220*c* on the activity database 230. The agent component 222 then accesses, requests, or polls the activity database 230 for any pending or scheduled activities for its corresponding target host device for which the agent component 222 is on-boarded. After the activity is executed on the target host device, the agent component 222 collects information associated with the recovery of the target host device and/or the distributed system partially implemented by that target host device. The agent component 222 stores the collected information on the activity database 230, which is accessed by the watcher component 204 of the manager component 202.

The manager component 202 includes the watcher component 204 and the scheduler component 206, as described above, and also includes a translator component 210, and a configuration component 212. The watcher component 204 determines a state of the distributed system and provides that state to the scheduler component 206. The watcher component 204 may provide the system state to the scheduler component 206 when the state changes, at predetermined time intervals, when requested by the scheduler component 206, etc. In the illustrated embodiment, the watcher component 204 obtains at least some state information from a state monitor system 240 (which may be a system that is separate and distinct from the ITS system and collects/monitors host device state information and/or distributed system state information). In some embodiments, the watcher component 204 aggregates state information for each of a plurality of host devices (e.g., host devices 220*a*-220*c* in FIG. 2A), each target host device 220*b*-220*c*, each instance of the distributed system on each host device or each target host device, or the like. Although the watcher component 204 is illustrated as receiving the state information from the state monitor system 240, embodiments are not so limited. And in other embodiments, the watcher component 204 may monitor and/or obtain the state information directly from the distributed system, from each host device implementing the distributed system, each target host devices, or from other systems (not shown) that track and monitor various operational characteristics of the distributed system.

The watcher component 204 also obtains the activity results of previously executed activities from the activities database 230, which may be utilized to further determine or modify the state of the distributed system. For example, if the activity results information indicates that there was a problem associated with the recovery of the distributed system, then the watcher component 204 may indicate that the distributed system is in an unhealthy state—for a least a predetermined amount of time or until reset by the owner 245—regardless of the state information obtained from the state monitor system 240. In some embodiments, if the activity results indicate a problem associated with the recovery of the distributed system or the target host device from the failure (e.g., the agent component 222 fails to come back on line because the target host device 220*b* does not properly restart after a power-down or reconnect after a network connection termination, the agent component 222 was unable to send a failure notification to an owner 245, etc.), the watcher component 204 can send a problem notification to the owner 245 (e.g., a manager, administrator, etc. of the computing resource service 107 of FIG. 1).

The scheduler component 206 utilizes the system state information and various configuration information obtained from the configuration component 212 to determine and schedule failure scenarios for execution by one or more target host devices. In some embodiments, failure scenarios may be scheduled for a plurality of different target host devices to execute in parallel—so long as there are other host devices to implement the distributed system without detrimentally impacting the performance or state of the distributed system. The configuration information utilized to select and schedule the failure scenarios may include, but is not limited to, parameters for which target host devices include an on-boarded agent component 222, failure scenarios and/or activities, on what target host devices to execute a failure scenario or activity, when scenarios are to be executed or prevented from execution (e.g., during peak utilization time of the distributed system), delay times between running two scenarios (e.g., after executing a scenario on device_A, do not run another scenario, same or different, on device_A for 24 hours), etc. The configuration information may be provided by the owner 245. The scheduler component 206 may also store various metrics associated with the scheduled scenarios on a metrics system or database 235. These metrics may indicate a day and time of which scenarios were scheduled to be executed on each target host device, the system state when a scenario is scheduled for execution, or the like.

After the scheduler component 206 selects a scenario to schedule, it provides the scenario to a translator component 210. The translator component 210 determines one or more activities associated with the selected scenario. In other embodiments, the translator component 210 may determine various computing characteristics of a target host device (e.g., type of operating system, available commands on the target host device, etc.) such that the translator component 210 converts the scenario into one or more commands, rather than activities, that can be executed by the target host device. In the illustrated embodiment, the translator component 210 stores the activities associated with the selected scenario on the activity database 230. But in other embodiments, the manager component 202 (e.g., the scheduler component 206 or the translator component 210) may provide the activities (or scenarios or commands) directly to the agent component 222 without being stored on the activity database 230.

As mentioned above and described in more detail below, the agent component 222 obtains the activities from the activity database, executes the activity on the target host device to cause a failure to occur on the target host device, monitor recovery of the distributed system and/or the target host device, and store recovery information or other activity results on the activity database 230.

Since the ITS system described herein is capable of causing failures to host devices of a distributed system, the ITS system also employs a variety of security mechanisms to reduce security risks of others manipulating the system and improperly causing failures. In various embodiments, each agent component 222 may be uniquely identified with its own set of security credentials such the target host device authenticates that the agent is on-boarded on that host device and is authentic. The agent components 222 may also be provided root access for selected commands such that other commands, even if from the agent, are not performed. Similarly, some commands associated with a failure may be white-listed at the code level so that any non-white-listed commands are not executed, even if they come from an authenticated agent.

In other embodiments, the activity database 230 may store activity information in designated tables owned by each the agent component 222. In this way, an agent only has access to activities that the manager component specifically schedules for that agent and cannot access or will ignore other activities associated with other agents. In at least one embodiment, the activities are signed and authenticated with the owner's 245 credentials, which are known to or accessible by the agent. In this way, for a perpetrator to schedule an unintended activity, they would need to gain access to the owner's credentials, which may be stored in a secure local system that may itself have additional security mechanisms to prevent access from unauthorized users. In some other embodiments, each distributed system may have its own signing and access credentials, which are known to the agent associated with that distributed system and the manager. It should be noted that other security mechanisms may also be employed.

Figure 2C:
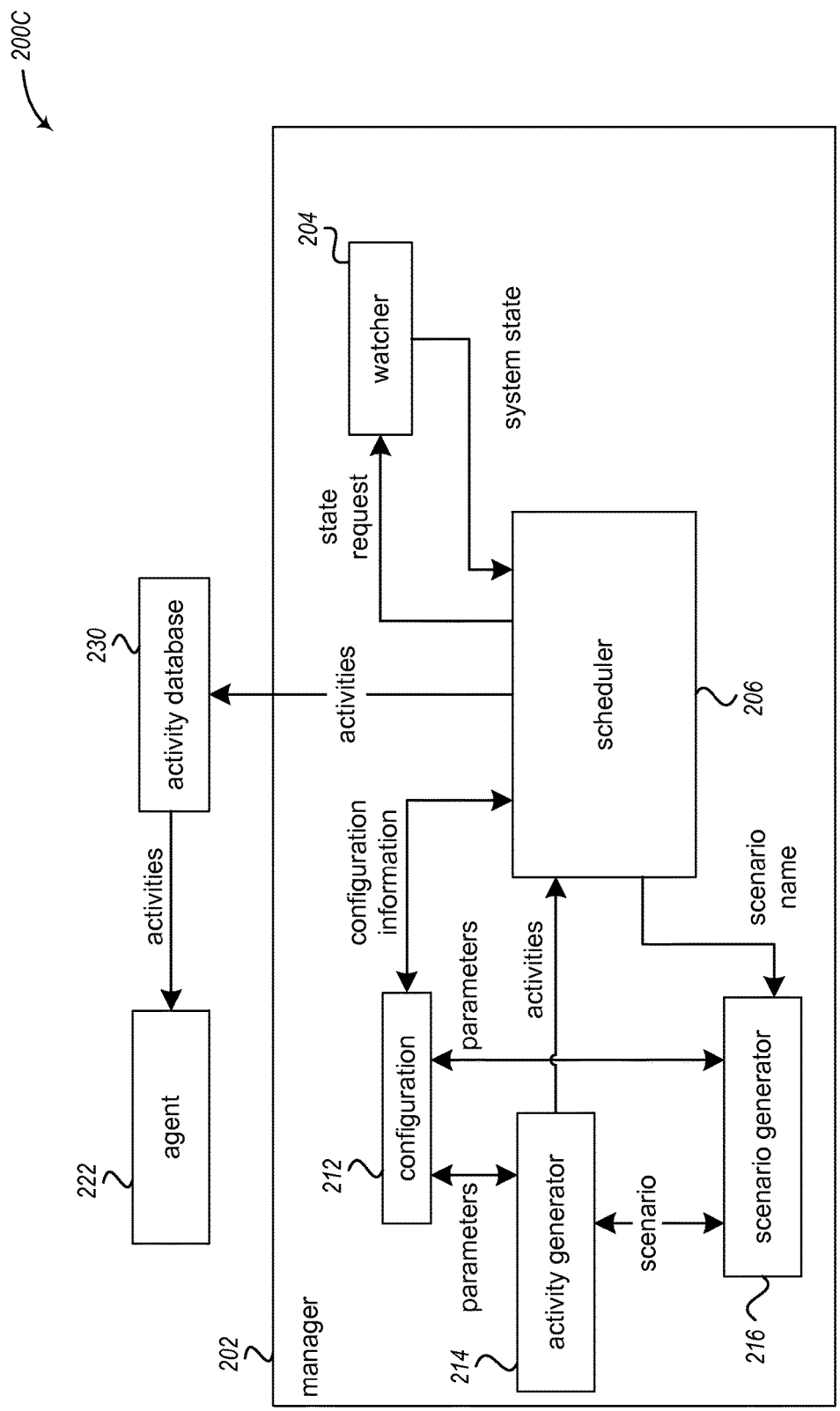

System 200C in FIG. 2C provides additional details regarding systems 200A and 200B and the infrastructure testing service (ITS) described herein. The system 200C includes the manager component 202, the agent component 222 on a target host device, and the activity database 230. As described above, the manager component 202 includes the watcher component 204, the scheduler component 206, and the configuration component 212. The watcher component 204 determines a state of the distributed system, which is described elsewhere herein, and provides the system state to the scheduler component 206.

As described elsewhere, the scheduler component 206 determines and schedules failures to occur on target host devices. In some embodiments, the scheduler component 206 may execute in a multi-instance configuration such that each separate instance is attempting to schedule failure scenarios for a plurality of different distributed systems. In at least one embodiment, each separate schedule instance obtains a lock on a distributed system when it schedules failure scenarios, which can prevent multiple different scenarios being run on a single distributed system in parallel. Otherwise, the distributed system may inadvertently be impacted due to too many simultaneous failures. Although such failure testing and monitoring may be beneficial to test the recoverability of the distributed system, such an impact could reduce efficiency or render the distributed system unable to perform its intended purpose, which can have an undesirable result—especially if this were to occur during peak usage time of the distributed system. As described elsewhere herein, the scheduler component 206 may schedule individual activities or scenarios with a plurality of activities in a fixed order of execution. If the scheduler component 206 is unable to schedule an activity of a scenario (e.g., if the state of the distributed system changes), then all other previously scheduled activities for that scenario may be unscheduled. And the scheduler component 206 may attempt to reschedule that scenario at a later time or date (which may be determined by the configuration information associated with the scenario.

The scheduler component 206 obtains (e.g., randomly, upon a request to run a failure test, at predetermined time intervals, or the like) a list of on-boarded agent components 222 for a distributed system. The scheduler component 206 then requests configuration information from the configuration component 212 for the distributed system. The configuration information may, among other things, identify one or more failure scenarios, when to execute the scenarios, on what distributed system or target host devices to execute the scenario, or the like. Based on this information, the scheduler component provides the scenario name to the scenario generator 216, which utilizes various parameters obtained from the configuration component 212 to generate the requested scenario. The scenario generator 216 communicates with the activity generator 214, which also utilizes various parameters obtained from the configuration component 212, to generate one or more activities associated with the scenario. The activity generator 214 provides the activities to the scheduler component 206, which in turn schedules the activities for execution by the agent component 222 (e.g., by storing the activities and the agent component 222 information on the activity database 230).

Figure 2D:
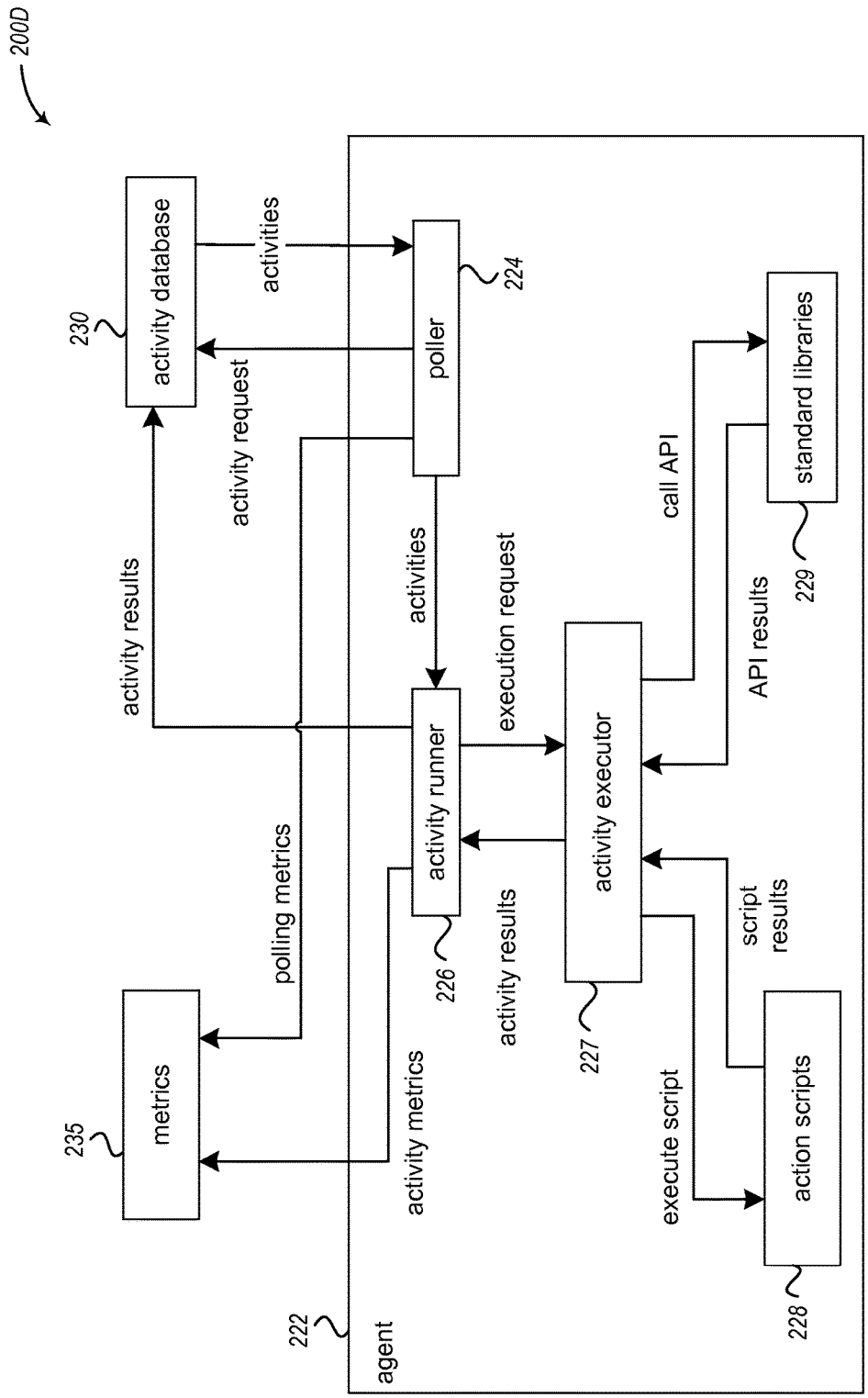

System 200D in FIG. 2D provides additional details regarding systems 200A, 200B, and 200C and the infrastructure testing service (ITS) described herein. System 200D illustrates one example of the agent component 222 and its interactions with the activity database 230 to execute commands on a target host device to cause a failure to occur on the target host device.

The agent component 222 includes a poller component 224, an activity runner component 226, and an activity executor component 227. The poller component 224 sends activity requests to the activity database 230. In some embodiments, the poller component 224 may send these requests randomly, at predetermined time periods, regular time intervals, etc. If the activity database 230 has stored thereon one or more activities for the agent component 222 to execute, then the activity database 230 provides those activities to the poller component 224. It should be recognized that, as described elsewhere herein, activities may also be pushed to the agent component 222 without having to send requests or query the activity database 230. Likewise, the agent component 222 may also receive scenarios or specific commands to execute in additional embodiments not illustrated in FIG. 2D.

In various embodiments, the poller component 224 may store or otherwise mark an activity as read on the activity database 230, which can help prevent a same activity being executed more than once on the same target host device. Upon successfully marking the activity as read, the poller component 224 provides the received activities to the activity runner component 226. In some embodiments, the activities may be read in increasing order (e.g., based on the order in which they were scheduled), and the poller component 224 tracks the last read activity and does not read other activities that are older than the last read activity. This order of execution can be useful in maintaining consistency among testing of multiple target host devices, but may also help increase the security of the system by reducing the likelihood that a perpetrator could add additional activities in the proper order. In some embodiments, the poller component 224 also provides various polling metrics and statistics (e.g., what and when activity requests were provided to the activity database 230, whether the poller component 224 receives an activity in response to the request, etc.) to the metrics system 235 for storage.

The activity runner component 226 provides an activity request to the activity executor component 227 based on the activities it receives from the poller component 224. In some embodiments, the activity runner component 226 manages when activities are executed, such as whether they are executed sequentially or parallel based on the activity configuration (e.g., as set by the owner and/or defined in by the configuration component 212 in FIG. 2B). The activity executor component 227 determines and executes one or more commands on the target host device based on the requested activity. In some embodiments, the activity executor component utilizes a set of packages—action scripts 228 and standards library 229—to determine the commands necessary to execute the activity. For example, the activity executor component 227 may provide a execute script command to the action scripts 228, which in turn may automatically execute a predefined script (which may include a plurality of computer commands or instructions) and returns results from the execution of the script on the target host device to the activity executor component 227. In another example, the activity executor component 227 may call an API from the standard libraries 229, which is utilized to execute one or more commands on the target host device, and returns results to the activity executor component 227. The activity executor component 227 provides the activity results back to the activity runner component 226. And the activity runner component 226 stores the activity results on the activity database 230, and generates various different activity metrics based on the activity results and provides those metrics to the metrics system 235.

Although FIGS. 2A-2D illustrate the manager component 202 as providing activities to the activities database 230, which provides the activities to the agent component 222, embodiments are not so limited. Rather, the manager component 202 may also store failure scenarios or specific commands on the activity database, and the agent component 222 may directly execute those specific commands or may determine one or more commands based on the failure scenarios. Similarly, the manager component 202 may provide the scenarios, activities, or commands directly to the agent component 222 (or through another system or communication interface) without storing them on the activity database 230.

FIG. 3 is a block diagram illustrating example computing systems suitable for executing an embodiment of a system for performing infrastructure testing. In particular, FIG. 3 illustrates example system 300, which includes a server computer system 305, user computer systems 350, and host systems 370.

The server computing system 305 is suitable for performing automated operations to provide at least some of the described techniques, including to operate an ITS manager 342 and computing resource system module(s) 340 that provide an embodiment of a computing resource service, with which at least part of the described techniques can be used, although in other embodiments the described techniques may be used in other environments that do not include the computing resource service.

In the illustrated embodiment, the server computing system 305 has components that include one or more hardware CPU ("central processing unit") computer processors 307, various I/O ("input/output") components 310, storage 320, and memory 330. The illustrated I/O components include a display 311, a network connection 312, a computer-readable media drive 313, and other I/O devices 315 (e.g., a keyboard, a mouse, speakers, etc.). In addition, the user computer systems 350 may each have components similar to those of the server computing system 305, including one or more CPUs 351, I/O components 352, storage 354, and memory 357, although some details are not illustrated for the computing systems 350 for the sake of brevity. The host systems 370 also may each have components similar to those of the server computing system 305, including one or more CPUs 371, I/O components 372, storage 374, and memory 377, although some details are not illustrated for the host systems 370 for the sake of brevity. Furthermore, computing system 384 may include components similar to those of server computing system 305, but some of those details are not illustrated for computing system 384 for the sake of brevity.

One or more modules of the ITS manager 342 (e.g., ITS manager 117 of FIG. 1) are stored in memory 330 to schedule failure scenarios on target host devices of host systems 370 described herein, and in some embodiments each module includes various software instructions that, when executed, program one or more of the CPU processors 307 to provide the described functionality.

One or more computing resource system modules 340 (e.g., computing resource system modules 112 of FIG. 1) are stored in memory 330 to provide an embodiment of the computing resource service, and in some embodiments each includes various software instructions that, when executed, program one or more of the CPU processors 307 to provide the described functionality. The module(s) of the ITS manager 342 and/or the computing resource system module 340 interact with the user computing systems 350, computing system 384, and/or host systems 370 over the network 390 (e.g., via local or private networks within the computing resource service, the Internet or World Wide Web, via a private cellular network, etc.).

Various information related to the functionality of the ITS manager 340 may be stored in storage 320 and used during operation, such as scenarios 321 related to which scenarios can occur on which target host devices, collected metrics 323 related to previously executed scenarios and various metrics associated with recovery of a distributed system and/or a target host device of host systems 370, and user data 387 related to particular users (e.g., their account information, specified configuration information for their provided computing resources, etc.). The storage 320 may also store various other information, such as the following: user virtual networks data related to particular virtual computer networks being provided to users (e.g., particular computing resources used by the virtual computer networks, such as with respect to the provided computing nodes; specified network topologies and other specified configuration information for the virtual computer networks; etc.); computing resources data related to particular computing resources (e.g., information about other computing resources being provided to users, information about additional computing resources that are available to be used as such provided computing resources, etc., such as with respect to the provided computing nodes); etc.

The host systems 370 may be computing systems that are used to provide a distributed system to one or more users, such as by a computing resource service to provide virtual computer networks and other computing resources, or to provide other functionality or services of one or more computing resource services. Some of the host systems 370 are target host devices (e.g., target host devices 220b-220c in FIG. 2A), such that the memory 377 stores one or more modules of ITS agent 382 (e.g., ITS agent 123 of FIG. 1) and the storage 374 stores one or more commands 381 for implementing a failure on the host system 370.

The computing system 384 may be one or more computing systems that are used to store an activity database 385. The activity database 385 (e.g., activity database 230 in FIGS. 2B-2D) may store various activities and/or activity results (e.g., recovery information) accessible to the server computer system 305 and the host systems 370. In some embodiments, the activity database 385 may operate as a gateway for passing scheduled failure information (e.g., scenarios, activities, commands, etc.) from the ITS manager 342 to the ITS agents 382) and results from the ITS agents 382 to the ITS manager 342. However, embodiments are not so limited, and in other embodiments, the ITS manager 342 may communicate directly with the ITS agents 382 without the activity database 385.

The user computing systems 350 may be executing various software as part of interactions with the computing resource system module(s) 340 or ITS manager 342. For example, user computer systems 350 may each be executing software in memory 357 to interact with computing resource system module(s) 340 and/or ITS manager 342, such as a Web browser, including to provide configuration information for performing various failure scenarios on the host systems 370, and to interact with or otherwise use the computing resources provided by the computing resource service.

It should be appreciated that computing systems 305, 350, and 370 are merely illustrative and are not intended to limit the scope of the present disclosure. The computing systems may instead each include multiple interacting computing systems or devices, and the computing systems may be connected to other devices that are not illustrated, including through one or more networks such as the Internet, via the Web, or via private networks (e.g., mobile communication networks, etc.). More generally, a computing system or other computing node may comprise any combination of hardware or software that may interact and perform the described types of functionality, including, without limitation, desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the computing resource system module(s) 340 and/or the collect and compare system 342 may in some embodiments be distributed in one or more modules, as described elsewhere herein.

It should also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the computing resource system module(s) 340 and/or the collect and compare system 342) or data structures, such as by execution of software instructions of the one or more software programs and/or by storage of such software instructions and/or data structures. Furthermore, in some embodiments, some or all of the systems or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present technologies may be practiced with other computer system configurations.

Figure 4:
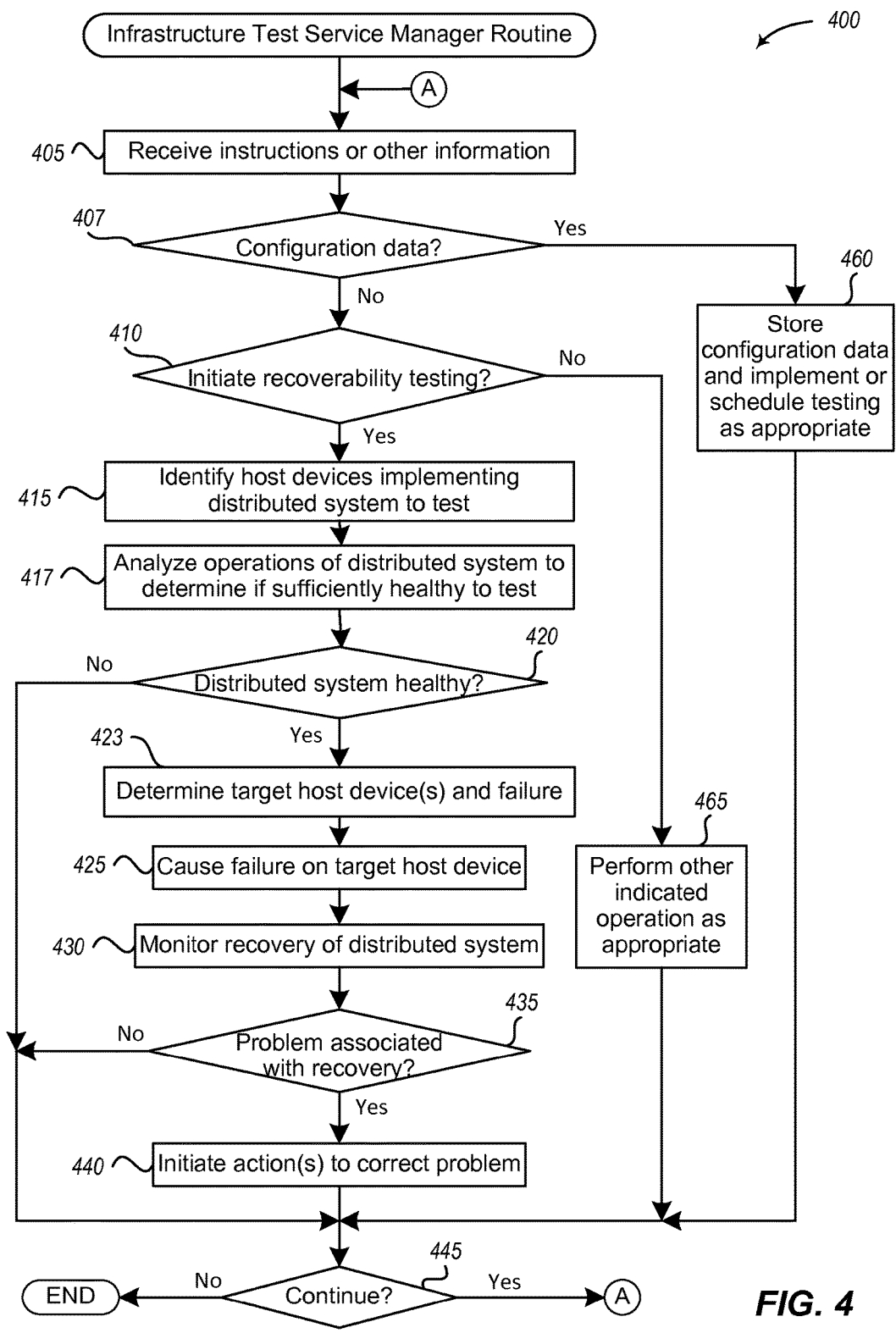
FIG. 4 illustrates a flow diagram of an example embodiment of an Infrastructure Test Service Manager routine.
Figure 5:
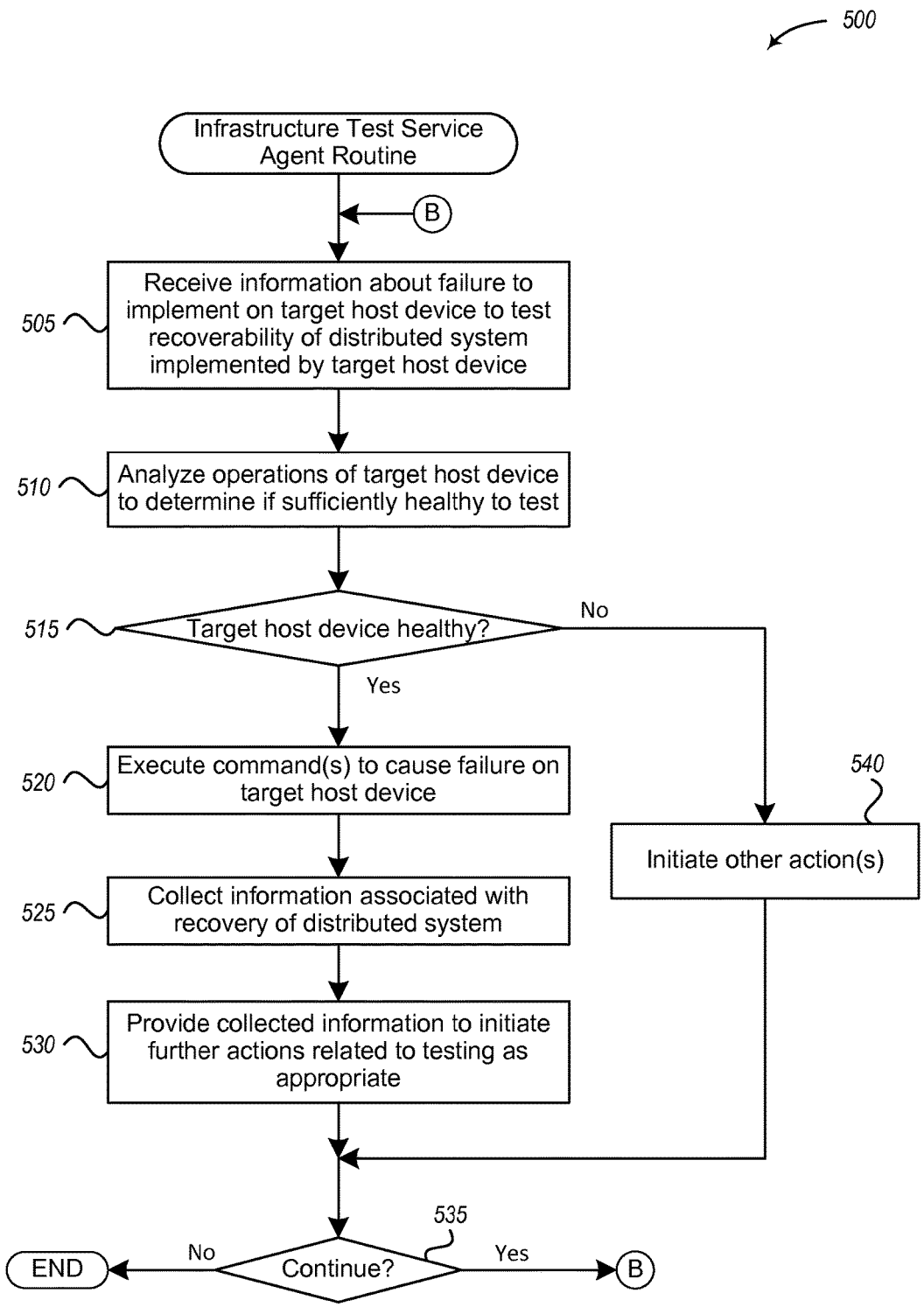
FIG. 5 illustrates a flow diagram of an example embodiment of an Infrastructure Test Service Agent routine.

FIGS. 4 and 5 illustrate a flow diagram of an example embodiment of an Infrastructure Test Service Manager routine 400 and an Infrastructure Test Service Agent routine 500, respectively. The routine 400 may be provided by, for example, execution of the ITS manager 342 of FIG. 3, the ITS manager 117 of FIG. 1, the manager component 202 of FIGS. 2A-2C, or otherwise by a computing resource service as discussed herein. And the routine 500 may be provided by, for example, execution of the ITS agent 382 of FIG. 3, the ITS agent 123 of FIG. 1, the agent component 222 of FIGS. 2A-2D, or otherwise by a computing resource service as discussed herein. The routine 400 and 500 may be employed in conjunction to perform the described techniques for providing a distributed system on a plurality of host devices and providing failure scenarios to one or more target host devices to test recoverability of the distributed system or the target host devices. The described techniques may be employed in a computing resource service that provides user-configurable managed computing nodes or other computing-related resources to users, or in other environments with a plurality of devices hosting a distributed system.

In the illustrated embodiment of FIG. 4, the routine 400 begins in block 405, where instructions or other information are received. In some embodiments, the instructions or other information may be from a user, a service owner (e.g., the owner 245 of FIG. 2B), etc. The instructions and information may include user or client data (e.g., configuration information, scenarios, or other user-configurable parameters), requests to test the recoverability of a distributed system, or the like.

After block 405, the routine continues to decision block 407 to determine if the instructions or other information received at block 405 includes configuration data, and if so the routine 400 continues at block 460 to store and/or configure one or more failure scenarios based on the user data (e.g., storage of configuration information on the configuration component 212 in FIG. 2B).

If it is instead determined in decision block 407 that the instructions or other information received at block 405 is not configuration data, then the routine 400 continues at decision block 410. At decision block 410, the routine 400 determines if the instruction received at block 405 is to test the recoverability of a distributed system, and if so the routine 400 continues to block 415; otherwise, the routine 400 continues to block 465. In some embodiments, the instruction may identify a distributed system that is to be tested, specific target host devices of that distributed system, or the like.

In block 465, the routine 400 performs one or more other indicated operations, if any, as appropriate. For example, in some embodiments, the routine may receive requests to manipulate provided computing resources of one or more computing nodes provided to the customer the computing resource service, and if so may perform activities to satisfy such requests if they are authorized. Other types of operations performed with respect to block 465 may also include various administrative operations for the computing resource service, such as, for example, performing operations to register new users who can use the provided computing node(s).

If it is instead determined in decision block 410 that a request to test the recoverability of a distributed system has been received, then the routine 400 continues at block 415. At block 415, the routine 400 identifies all host devices that are implementing the distributed system. In some embodiments, the configuration information may identify each host device associated with a distributed system. In other embodiments, the received instructions may identify the host devices.

After block 415, the routine 400 continues to block 417 to analyze operations of the distributed system to determine if the distributed system or its host devices are sufficiently healthy to test one of the host devices. This analysis may include identifying a current number of host devices being utilized to implement the distributed system, current resource consumption by those host devices, backlog or latency of operations of the distributed system, network traffic, etc.

After block 417, the routine 400 continues to decision block 420 to determine if the distributed system is healthy, which may be based on one or more operational parameters of the distributed system or one or more of the host devices being satisfied. For example, the distributed system may be determined to be healthy if the number of host devices implementing the distributed system is great enough such that the distributed system can still operate (e.g., maintain a current state) even if one or more of the host devices fails (e.g., due to execution of a failure scenario). If it is determined that the system is healthy, the routine continues at block 423; otherwise, the routine continues at decision block 445.

At block 423, the routine 400 determines a failure and a target host device from the determined host devices for the failure to occur. In some embodiments, the determined target host device and failure may be identified by configuration information provided by an owner. In other embodiments, the target host device may be randomly or systematically selected from the host devices such that the failure is ultimately executed on each host device.

After block 423, the routine 400 continues at block 425 to cause a failure to occur on the determined target host device(s). In various embodiments described herein, the failure is provided to an agent executing on the target host device, which can execute the failure, such as illustrated with the routing 500 in FIG. 5. In various embodiments, failures are stored on an activity database that is accessible to the agent, as described elsewhere herein.

After block 425, the routine 400 continues at block 430 to monitor recovery of the distributed system. In some embodiments, this monitoring may include receiving recovery information, metrics, or other results information from the agent. In other embodiments, a lack of response from the agent may indicate that the target host device did not properly recover and the agent did not reestablish communication with either the activity database or the manager component.

After block 430, the routine 400 continues at decision block 435 to determine if there is a problem associated with the recovery of the distributed system. In some embodiments, a problem may be detected if the ITS manager does not receive recovery information from the ITS agent. In another embodiment, the recovery information received may be above a threshold or include specific information that there was a problem with the recovery. In yet other embodiments, information from other agents—not executing on the target host device that was caused to fail—may indicate that there was a problem with the recovery of the distributed system (e.g., if a number of network packets sent through a host device increases when a failure occurs on another host device, but the number of network packets continues to increase even after the other host device itself has recovered from the failure). If there is a problem with the recovery of the distributed system or the target host device, then the routine 400 continues a block 440; otherwise, the routine 400 continues at decision block 445.

At block 440, the routine initiates one or more actions to correct the problem. In some embodiments, the action may be to send a notification to the owner or other maintenance technician indicating that there was a problem. In other embodiments, the action may be to automatically initiate a modification to the target host device, such as if the problem is associated with out-of-date software, an improper configuration setting of the target host device, etc.

After blocks 440, 460, or 465 or if it is determined in decision block 420 that the distributed system is not in a state to cause a failure to a host device the routine 400 continues at decision block 445. In decision block 445, the routine 400 determines whether to continue the routine and process additional information, such as until an explicit indication to terminate is received or a predetermined set of failures is performed. If it is determined to continue, the routine 400 loops to block 405, otherwise, the routine 400 ends.

In some embodiment, the routine 400 may loop for a plurality of different target host devices that are among the host devices implementing the distributed system such that the recoverability of the distributed system is tested for a failure on each of the plurality of host devices. Similarly, in other embodiments, the routine 400 may loop for a single target host device such that recoverability of the distributed system is tested for a plurality of different failures on the same target host device. However, embodiments are not so limited and other failures may be performed on a variety of different target host devices to test the recoverability of the distributed system from a plurality of different failures.

As indicated above, the routine 500 of FIG. 5 may be executed by an agent executing on a target host device. the routine 500 begins at block 505 to receive information about a failure to occur on the target host deice to test the recoverability of the distributed system implemented by target host device or recovery of the target host device itself. In some embodiments, the information may be specific commands for the target host device to execute. In other embodiments, the information may be a failure scenario or failure activity, and the ITS agent determines the one or more commands for the target host device to execute to cause the failure identified by the scenario or the activities.

In at least one of various embodiments, the ITS agent provides a request for currently scheduled failures to an activities database or to the ITS manager, as described elsewhere herein. In response to the request, the ITS agent may receive one or more failure activities to perform on the target host device. In other embodiments, the scheduled failures may be pushed to the ITS agent (e.g., by the ITS manager) without the agent sending a request for scheduled failures.

After block 505, the routine 500 continues to block 510 to analyze operations of the target host device to determine if the target host device itself is sufficiently healthy to test recoverability of the distributed system and the target host device. This analysis may include identifying current resource consumption by the target host device, backlog or latency of operations of the distributed system executing on the target host device, etc. This health analysis is used to determine a local health status of the target host device, compared to the total distributed system health status determination at blocks 417 and 420 in FIG. 4.

After block 510, the routine 500 continues to decision block 515 to determine if the target host device is healthy, which may be based on one or more operational parameters of the target host device being satisfied. For example, the target host device may be determined to be healthy if the current resource consumption, operational backlog or latency of the target host device is below one or more predetermined thresholds. If it is determined that the target host device is healthy, the routine continues at block 520; otherwise, the routine continues at block 540 to initiate one or more other actions (e.g., providing an indication that the target host device is unable to perform the failure test, enters a wait state to determine if the target host device becomes healthy, sends a request to the manager component to reschedule the test, etc.).

If the target host device is healthy, the routine 500 continues from decision block 515 at block 520 to execute one or more commands to cause the failure to occur on the target host device. As described above, the commands may be provided to the agent or may be determined by the agent. In at least one embodiment, the agent provides the commands to the operating system or other software executing on the target host device, which executes the command to cause the failure to occur. In other embodiments, the agent acts as an interface for intercepting network traffic or for providing various input/output results to the operating system to implement the failure on the target host device.

After block 520, the routine 500 continues at block 525 to collect information associated with the recovery of the distributed system. In some embodiments, the collected information may include, but is not limited to, the recovery time of the distributed system, actions performed by the target host device in an attempt to recover from the failure, other execution and recovery details, etc. It should be noted that in some situations where the target host device does not properly recover (e.g., the target host device does not restart after being shut down), the agent may not resume execution on the target host device and may not collect recovery information. This improper recovery (and thus a problem in the recovery of the target host device) may be identified by the manager due to a lack of communication from the agent.

After block 525, the routine 500 continues at block 530 to provide the collected information to initiate actions related to the testing. In some embodiments, the agent may determine if there is a problem with the recovery of the distributed system (e.g., if the target host device takes too long to restart from a power failure), and in response to such a problem send a notification to the owner or maintenance technician indicating such a problem. In other embodiments, the agent provides the collected information to the manager for utilization in implementing additional actions.

After block 530 the routine 500 continues at decision block 535 to determine whether to continue the routine and process additional information, such as until an explicit indication to terminate is received or a predetermined number of failures is performed. If it is determined to continue, the routine 500 loops to block 505, otherwise, the routine 500 ends.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art should appreciate that in other embodiments the operations may be performed in other orders and in other manners. Those skilled in the art should also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it should be appreciated that, although specific embodiments have been described herein for purposes of illustration, various modifications may be made without deviating from the spirit and scope of the invention.

Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   receiving, by a computing system of an online program execution service that provides computing resources for use in executing programs of users of the online program execution service and that provides infrastructure test functionality for the users, instructions from one of the users to configure testing of a failure for a distributed system of the user that is implemented using a plurality of computing devices of the provided computing resources and that provides a service over a computer network to end users;
   determining, by the computing system and prior to the testing of the failure on a target host device of the plurality, that the distributed system satisfies a specified operational characteristic indicating that the distributed system is available for the testing, including determining that computing devices of the plurality other than the target host device are capable of providing the service for the distributed system during the testing of the target host device;
   causing, by the computing system and based on the determining that the distributed system satisfies the operational characteristic, the failure to occur on the target host device during operation of the distributed system to test recovery of the distributed system from the failure, including initiating execution, on the target host device, of a command that implements the failure;
   monitoring, by the computing system, the recovery of the distributed system from the failure, and determining a problem in the recovery; and
   initiating, by the computing system and based on the monitoring, an action for correcting the determined problem.

2. The computer-implemented method of claim 1 further comprising receiving, by the computing system and while the failure on the target host device continues to be caused by the execution of the command, instructions from the user to halt the testing of the failure on the target host device, and halting the execution of the command and the monitoring of the recovery in response to the instructions.

3. The computer-implemented method of claim 1 further comprising initiating, by the computing system and in response to the received instructions from the user, execution of a software module on each of the computing devices for use in implementing the testing for the distributed system.

4. The computer-implemented method of claim 1 further comprising, under control of the online program execution service and before the receiving of the instructions from the user, implementing, by a computing system of the online program execution service, the distributed system for the user using the computing resources provided by the online program execution service, the implementing of the distributed system including selecting the computing devices, provisioning the computing devices to execute one or more programs for the user, and initiating the executing of the programs.

5. The computer-implemented method of claim 1 wherein the infrastructure test functionality includes multiple types of failures that are available for use in the testing, wherein the instructions from the user specify configuration information for the testing that includes a selected type of failure from the multiple types of failures, and wherein the causing of the failure to occur on the target host device includes causing the selected type of failure to occur on the target host device.

6. The computer-implemented method of claim 1 wherein the instructions from the user specify configuration information for the testing that includes the specified operational characteristic, and wherein the specified operational characteristic includes a scheduled testing time, or information regarding a minimum quantity of the computing devices that are participating in the providing of the service.

7. The computer-implemented method of claim 1 wherein the instructions from the user specify configuration information for the testing that includes a condition for use in selecting the target host device from the computing devices, and wherein the method further comprises performing the selecting of the target host device using the condition.

8. The computer-implemented method of claim 1 further comprising receiving, by the computing system, status information supplied by an executing program of the user regarding the operation of the distributed system, and wherein the determining that the distributed system satisfies the specified operational characteristic is based at least in part on the status information.

9. The computer-implemented method of claim 1 wherein the causing of the failure to occur on the target host device is performed for each of multiple target host devices selected from the computing devices as part of providing the infrastructure testing functionality for the distributed system, and wherein the method further comprises:
   receiving, by the computing system and during the providing of the infrastructure testing functionality for the distributed system, additional instructions from the user to immediately stop the providing of the infrastructure testing functionality for the distributed system; and
   halting, by the computing system in response to the additional instructions and before the providing of the infrastructure testing functionality for the distributed system is completed, the providing of the infrastructure testing functionality for the distributed system.

10. A system comprising:
    a processor of a computing system; and
    a memory storing instructions that, when executed by the processor, cause the processor to provide testing of an executing distributed system implemented with computing devices by:
      determining, before initiating the testing of the executing distributed system on a target host device that is one of the computing devices, that the executing distributed system satisfies a specified operational characteristic, including determining that at least some of the computing devices other than the target host device are capable of continuing to implement the executing distributed system without the target host device;
      causing, based at least in part on the determining, a failure to occur on the target host device to test recovery of the executing distributed system from the failure, including initiating execution of a command on the target host device that alters performance of the target host device; and monitoring the recovery of the executing distributed system from the failure, and initiating further actions for the testing based on the monitoring.

11. The system of claim 10 wherein the stored instructions further cause the processor to implement functionality of an infrastructure test service, including to receive, while the failure on the target host device is being caused by the execution of the command, instructions from a user of the infrastructure test service to halt the testing of the executing distributed system, and to halt the execution of the command and the monitoring of the recovery in response to the instructions.

12. The system of claim 10 wherein the determining that the executing distributed system satisfies the specified operational characteristic includes determining that the at least some computing devices other than the target host device are operational and that a quantity of the at least some computing devices exceeds a defined threshold.

13. The system of claim 10 further comprising:
another memory storing other instructions that, when executed by the target host device, cause the target host device to participate in the testing by:
determining the command to execute on the target host device;
executing the command to initiate the failure on the target host device;
collecting, after the failure on the target host device, recovery information that describes the recovery of the distributed system from the failure; and
providing, to the computing system, the collected recovery information, and wherein the initiating of the further actions for the testing is based on the provided collected recovery information.

14. The system of claim 10 wherein the causing of the failure to occur on the target host device includes providing access to information about a failure activity to agent software that is executing on the target host device, to cause the agent software to determine the command based on the failure activity and to execute the command on the target host device.

15. The system of claim 10 wherein the causing of the failure to occur on the target host device is successively performed for each of multiple computing devices of the computing devices by repeatedly randomly selecting one of the computing devices to be the target host device and waiting until the selected one computing device recovers from the failure caused on the selected one computing device before proceeding to randomly select another of the computing devices to be a next target host device.

16. The system of claim 10 wherein the failure caused on the target host device includes at least one of a host failure involving computing resources of the target host device, a network failure involving interactions of the target host device with other computers, or a service failure involving functionality provided by the executing distributed system to end users.

17. The system of claim 10 wherein the monitoring of the recovery includes determining a problem involved in the implementing of the distributed system, and wherein the initiating of the further actions for the testing includes removing the target host device from participating in implementing the distributed system for a period of time for additional automated testing, sending a notification to a human administrator indicating the determined problem, or generating a report with recovery information based on the monitoring.

18. A non-transitory computer-readable medium having stored contents that cause a computing system to at least:
determine, by agent software of an infrastructure testing service that is executing on the computing system, one or more commands to execute on the computing system to cause a failure on the computing system to test recoverability of a distributed system, wherein the distributed system is implemented on computing devices that include the computing system;
execute, by the computing system and based on the distributed system satisfying an operational characteristic, the one or more commands to cause the failure on the computing system;
collect, by the computing system and while the failure on the computing system is being caused by execution of the one or more commands, recovery information that describes operations of the distributed system during the failure to attempt to recover from the failure;
halt, by the computing system and while the failure on the computing system continues to be caused by the execution of the one or more commands, and in response to receiving instructions from a user of the distributed system, the execution of the one or more commands and the collection of the recovery information; and
provide, by the computing system, the collected recovery information to initiate further actions related to the testing that are based on the collected recovery information.

19. The non-transitory computer-readable medium of claim 18 wherein the stored contents further cause the computing system to receive, before the determining of the one or more commands and from an infrastructure testing service executing on a remote computing system, information about an activity that characterizes the failure, and wherein the determining of the one or more commands is based on the received information about the activity and on operating characteristics of the computing system.

20. The non-transitory computer-readable medium of claim 18 wherein the determining of the one or more commands includes:
obtaining stored information indicating multiple ordered activities that characterize the failure; and
selecting, for each of the multiple ordered activities, one of the determined one or more commands to implement the activity, and wherein the executing of the one or more commands includes, as the selected command for each of the multiple ordered activities is executed, updating the stored information to indicate that the activity is performed.

21. The non-transitory computer-readable medium of claim 18 wherein the stored contents further cause the computing system to determine, before the determining of the one or more commands, that the computing system satisfies another operational characteristic indicating that it is in a state to perform the testing.

* * * * *